(12) United States Patent
Han et al.

(10) Patent No.: US 10,370,152 B2
(45) Date of Patent: Aug. 6, 2019

(54) COATING COMPOSITION COMPRISING A HIGH MN POLYESTER AND A LOW MN POLYESTER

(71) Applicant: PPG Packaging Coatings (Suzhou) Co., Ltd., Suzhou (CN)

(72) Inventors: Feng Han, Suzhou (CN); Cunyi Fan, Suzhou (CN); Shimin Wang, Suzhou (CN)

(73) Assignee: PPG Coatings (Suzhou) Co., Ltd., Jiangsu (CN)

( * ) Notice: Subject to any disclaimer, the term of this patent is extended or adjusted under 35 U.S.C. 154(b) by 0 days.

(21) Appl. No.: 15/524,794

(22) PCT Filed: Nov. 5, 2015

(86) PCT No.: PCT/US2015/059232
§ 371 (c)(1),
(2) Date: May 5, 2017

(87) PCT Pub. No.: WO2016/073711
PCT Pub. Date: May 12, 2016

(65) Prior Publication Data
US 2017/0320629 A1    Nov. 9, 2017

(30) Foreign Application Priority Data

Nov. 5, 2014 (CN) .......................... 2014 1 0619339

(51) Int. Cl.
  B65D 65/42    (2006.01)
  B65D 25/14    (2006.01)
  C09D 167/02   (2006.01)

(52) U.S. Cl.
  CPC ............. B65D 25/14 (2013.01); B65D 65/42 (2013.01); C09D 167/02 (2013.01)

(58) Field of Classification Search
  USPC ........................................................ 525/418
  See application file for complete search history.

(56) References Cited

U.S. PATENT DOCUMENTS

2007/0036903 A1    2/2007    Mayr et al.

FOREIGN PATENT DOCUMENTS

| KR | 10-0405824 | 11/2003 |
| RU | 2188837 C2 | 9/2002 |
| WO | WO 2004/013240 A1 | 2/2004 |
| WO | 2012051540 | 4/2012 |

*Primary Examiner* — Terressa Boykin
(74) *Attorney, Agent, or Firm* — Lisa Geary

(57) ABSTRACT

A coating composition including (a) a first polyester material having a number-average molecular weight (Mn) of 500 to 5,500 Daltons, and (b) a second polyester material having a number-average molecular weight (Mn) of 6,000 to 100,00 Daltons. The first polyester material may have a glass transition temperature (Tg) of from 40° C. to 120° C. The coating composition is useful for, among other things, coating food and/or beverage containers, such as an undercoat layer of a two layer coating system that includes an undercoat layer and an overcoat layer.

16 Claims, No Drawings

COATING COMPOSITION COMPRISING A HIGH MN POLYESTER AND A LOW MN POLYESTER

The present invention relates to coating compositions and in particular to coating compositions comprising polyesters and substrates to which such coating compositions are applied. The present invention also extends to food and beverage containers coated with said coating compositions.

A wide variety of coatings have been used to coat food and beverage containers. The coating compositions typically display certain properties such as being capable of high speed application, having excellent adhesion to the substrate, being safe for food contact and having properties, once cured, that are suitable for their end use.

Many of the coating compositions currently used for food and beverage containers contain epoxy resins. Such epoxy resins are typically formed from polyglycidyl ethers of bisphenol A (BPA). BPA is perceived as being harmful to human health and it is therefore desirable to eliminate it from coatings for food and beverage packaging containers. Derivatives of BPA such as diglycidyl ethers of bisphenol A (BADGE), epoxy novolak resins and polyols prepared from BPA and bisphenol F (BPF) are also problematic. Therefore there is a need to provide coating compositions for food and beverage containers which are free from BPA, BADGE and/or other derivatives but retain the required properties as described above.

Polyester resins produced by the polycondensation reaction of polyols and polyacids are well known in the coatings industry. Both linear and branched polyesters have been widely used in coating compositions. Further, they have been used to coat a variety of substrates such as metallic and non-metallic substrates.

The present invention provides one or more solutions to one of the above mentioned or other problems.

According to a first aspect of the present invention there is provided a coating composition comprising;
  (a) a first polyester material having a number-average molecular weight (Mn) of 500 to 5,500 Daltons, and
  (b) a second polyester material having a number-average molecular weight (Mn) of 6,000 to 100,000 Daltons.

The number-average molecular weight may be measured by any suitable method. Techniques to measure the number-average molecular weight will be well known to a person skilled in the art. The number-average molecular weight values and ranges provided herein were determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography.

In certain embodiments, the first polyester material may have an Mn of from about 500 to 5,500 Daltons (Da=g/mole), suitably from about 1,000 Da to about 5,500 Da, such as from about 1,500 Da to about 5,000 Da, or even from about 1,500 Da to about 4,000 Da.

In certain embodiments, the first polyester material may have an Mn of at least about 500 Da, suitably at least about 1,000 Da, such as at least about 1,500 Da. In certain embodiments, the first polyester material may have an Mn of up to about 5,500 Da, suitably up to about 5,000 Da, such as up to about 4,000 Da. Suitably, the first polyester material may have an Mn from about 500 Da to about 5,500 Da, suitably from about 1,000 Da to about 5,500 Da, such as from about 1,500 Da to about 5,500 Da. Suitably, the first polyester material may have an Mn from about 500 Da to about 5,000 Da, suitably from about 1,000 Da to about 5,000 Da, such as from about 1,500 Da to about 5,000 Da. Suitably, the first polyester material may have an Mn from about 500 Da to about 4,000 Da, suitably from about 1,000 Da to about 4,000 Da, such as from about 1,500 Da to about 4,000 Da.

The first polyester material may have any suitable weight-average molecular weight (Mw). In certain embodiments, the first polyester material may have an Mw of from about 500 to 11,000 Da, suitably from about 1,000 Da to about 11,000 Da, such as from about 1,500 Da to about 10,000 Da, or even from about 1,500 Da to about 8,000 Da.

In certain embodiments, the first polyester material may have an Mw of at least about 500 Da, suitably at least about 1,000 Da, such as at least about 1,500 Da. In certain embodiments, the first polyester material may have an Mw of up to about 11,000 Da, suitably up to about 10,000 Da, such as up to about 8,000 Da. Suitably, the first polyester material may have an Mw from about 500 Da to about 11,000 Da, suitably from about 1,000 Da to about 11,000 Da, such as from about 1,500 Da to about 11,000 Da. Suitably, the first polyester material may have an Mw from about 500 Da to about 10,000 Da, suitably from about 1,000 Da to about 10,000 Da, such as from about 1,500 Da to about 10,000 Da. Suitably, the first polyester material may have an Mw from about 500 Da to about 8,000 Da, suitably from about 1,000 Da to about 8,000 Da, such as from about 1,500 Da to about 8,000 Da.

A person skilled in the art will appreciate that techniques to measure the number-average molecular weight may also be applied to measure the weight-average molecular weight. Suitably, the weight average molecular weight may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography.

The second polyester material may have any suitable number-average molecular weight (Mn). In certain embodiments, the second polyester material may have an Mn of from about 6,000 to 100,000 Da, suitably from about 7,000 Da to about 50,000 Da, such as from about 8,000 Da to about 25,000 Da, or even from about 8,500 Da to about 20,000 Da.

In certain embodiments, the second polyester material may have an Mn of at least about 6,000 Da, suitably at least about 6,000 Da, suitably at least about 7,000, such as at least about 8,000 Da. In certain embodiments, the second polyester material may have an Mn of up to about 100,000 Da, suitably up to about 50,000 Da, such as up to about 25,000 Da, or even up to about 20,000 Da. Suitably, the second polyester material may have an Mn from about 6,100 Da to about 100,000 Da, suitably from about 7,000 Da to about 100,000 Da, such as from about 8,000 Da to about 100,000 Da, or even from about 8,500 to 100,000 Da. Suitably, the second polyester material may have an Mn from about 6,100 Da to about 50,000 Da, suitably from about 7,000 Da to about 50,000 Da, such as from about 8,000 Da to about 50,000 Da, or even from about 8,500 to 50,000 Da. Suitably, the second polyester material may have an Mn from about 6,100 Da to about 25,000 Da, suitably from about 7,000 Da to about 25,000 Da, such as from about 8,000 Da to about 25,000 Da, or even from about 8,500 to 25,000 Da. Suitably, the second polyester material may have an Mn from about 6,100 Da to about 20,000 Da, suitably from about 7,000 Da to about 20,000 Da, such as from about 8,000 Da to about 20,000 Da, or even from about 8,500 to 20,000 Da.

In certain embodiments, the second polyester material may have a number-average molecular weight (Mn) of from about 6,100 to 50,000 Da, suitably from about 6,250 Da to about 30,000 Da, such as from about 6,500 Da to about 30,000 Da, or even from about 8,500 Da to about 20,000 Da.

In certain embodiments, the second polyester material may have an Mn of at least about 6,100 Da, suitably at least about 6,250 Da, more suitably at least 6,500 Da, such as at least about 7,000 Da, or even at least about 8,000 Da. In certain preferred embodiments the polyester material may have an Mn of up to about 50,000 Da, suitably up to about 30,000 Da, or even up to about 20,000 Da. Suitably, the polyester material may have an Mn from about 6,100 Da to about 50,000 Da, suitably from about 6,250 Da to about 50,000 Da, such as from about 6,500 Da to 50,000 Da, such as from about 7,000 Da to 50,000 Da, or even from about 8,000 Da to 50,000 Da. Suitably, the polyester material may have an Mn from about 6,100 Da to about 20,000 Da, suitably from about 6,250 Da to about 30,000 Da, such as from about 6,500 Da to 30,000 Da, such as from about 7,000 Da to 30,000 Da, or even from about 8,000 Da to 30,000 Da. Suitably, the polyester material may have an Mn from about 6,100 Da to about 20,000 Da, suitably from about 6,250 Da to about 20,000 Da, such as from about 6,500 Da to 20,000 Da, such as from about 7,000 Da to 20,000 Da, or even from about 8,000 Da to 20,000 Da.

The second polyester material may have any suitable weight-average molecular weight (Mw). In certain embodiments, the second polyester material may have an Mw of from about 6,000 to 200,000 Da, suitably from about 7,000 Da to about 100,000 Da, such as from about 8,000 Da to about 50,000 Da, or even from about 8,500 Da to about 40,000 Da.

In certain embodiments, the second polyester material may have an Mw of at least about 6,000 Da, suitably at least about 7,000 Da, suitably at least about 8,000, such as at least about 8,500 Da. In certain embodiments, the second polyester material may have an Mw of up to about 200,000 Da, suitably up to about 100,000 Da, such as up to about 50,000 Da, or even up to about 40,000 Da. Suitably, the second polyester material may have an Mw from about 6,000 Da to about 200,000 Da, suitably from about 7,000 Da to about 200,000 Da, such as from about 8,000 Da to about 200,000 Da, or even from about 8,500 Da to 200,000 Da. Suitably, the second polyester material may have an Mw from about 6,000 Da to about 100,000 Da, suitably from about 7,000 Da to about 100,000 Da, such as from about 8,000 Da to about 100,000 Da, or even from about 8,500 to 100,000 Da. Suitably, the second polyester material may have an Mw from about 6,000 Da to about 50,000 Da, suitably from about 7,000 Da to about 50,000 Da, such as from about 8,000 Da to about 50,000 Da, or even from about 8,500 to 50,000 Da. Suitably, the second polyester material may have an Mw from about 6,000 Da to about 40,000 Da, suitably from about 7,000 Da to about 40,000 Da, such as from about 8,000 Da to about 40,000 Da, or even from about 8,500 to 40,000 Da.

In certain embodiments, the second polyester material may have a weight-average molecular weight (Mw) of from about 6,100 to 200,000 Da, suitably from about 8,000 Da to about 150,000 Da, such as from about 10,000 Da to about 100,000 Da, or even from about 15,000 Da to about 50,000 Da.

The second polyester material may have any suitable weight-average molecular weight (Mw). In certain embodiments, the second polyester material may have an Mw of at least about 6,100 Daltons, suitably at least about 8,000 Da, such as at least about 10,000 Da, or even about 15,000 Daltons. In certain embodiments, the second polyester material may have an Mw of up to about 50,000 Da, suitably about 100,000 Da, such as about 150,000 Da, or even up to about 200,000 Da. Suitably, the second polyester material may have an Mw from about 6,100 Da to about 200,000 Da, suitably from about 8,000 Da to about 200,000 Da, such as from about 10,000 Da to about 200,000 Da, or even from about 15,000 Da to about 200,000 Da. Suitably, the second polyester material may have an Mw from about 6,100 Da to about 150,000 Da, suitably from about 8,000 Da to about 150,000 Da, such as from about 10,000 Da to about 150,000 Da, or even from about 15,000 Da to about 150,000 Da. Suitably, the second polyester material may have an Mw from about 6,100 Da to about 100,000 Da, suitably from about 8,000 Da to about 100,000 Da, such as from about 10,000 Da to about 100,000 Da, or even from about 15,000 Da to about 100,000 Da. Suitably, the second polyester material may have an Mw from about 6,100 Da to about 50,000 Da, suitably from about 8,000 Da to about 50,000 Da, such as from about 10,000 Da to about 50,000 Da, or even from about 15,000 Da to about 50,000 Da.

In certain embodiments, the weight-average molecular weight (Mw) of the first polyester material is lower than the weight-average molecular weight (Mw) of the second polyester material.

In certain embodiments, the number-average molecular weight (Mn) of the first polyester material is lower than the number-average molecular weight (Mn) of the second polyester material.

The first polyester material (a) according to the present invention may comprise the reaction product of a polyacid and a polyol.

"Polyacid" and like terms as used herein, refers to a compound having two or more carboxylic acid groups, such as two, three or four acid groups, and includes an ester of the polyacid (wherein one or more of the acid groups is esterified) or an anhydride. The polyacid is suitably an organic polyacid.

Suitably, the carboxylic acid groups of the polyacid may be connected by a bridging group selected from: an alkylene group; an alkenylene group; an alkynylene group; or an arylene group.

The first polyester material may be formed from any suitable polyacid. Suitable examples include, but are not limited to one or more of the following: maleic acid; fumaric acid; itaconic acid; adipic acid; azelaic acid; succinic acid; sebacic acid; glutaric acid; decanoic diacid; dodecanoic diacid; phthalic acid; isophthalic acid; 5-tert-butyl-isophthalic acid; tetrachlorophthalic acid; tetrahydrophthalic acid; trimellitic acid; naphthalene dicarboxylic acid; naphthalene tetracarboxylic acid; terephthalic acid; hexahydrophthalic acid; methylhexahydrophthalic acid; dimethyl terephthalate; cyclohexane dicarboxylic acid; chlorendic anhydride; 1,3-cyclohexane dicarboxylic acid; 1,4-cyclohexane dicarboxylic acid; tricyclodecane polycarboxylic acid; endomethylene tetrahydrophthalic acid; endoethylene hexahydrophthalic acid; cyclohexanetetra carboxylic acid; cyclobutane tetracarboxylic; acids and anhydrides of all the aforementioned acids and combinations thereof.

"Polyol" and like terms, as used herein, refers to a compound having two or more hydroxyl groups, such as two, three or four hydroxyl groups. In certain embodiments, the hydroxyl groups of the polyol may be connected by a bridging group selected from: an alkylene group; an alkenylene group; an alkynylene group; or an arylene group. Suitably the polyol is an organic polyol.

The first polyester material may be formed from any suitable polyol. Suitable examples include, but are not limited to one or more of the following: alkylene glycols, such as ethylene glycol; propylene glycol; diethylene glycol; dipropylene glycol; triethylene glycol; tripropylene glycol; hexylene glycol; polyethylene glycol; polypropylene glycol and neopentyl glycol; hydrogenated bisphenol A; cyclohexanediol; propanediols including 1,2-propanediol; 1,3-propanediol; butyl ethyl propanediol; 2-methyl-1,3-propanediol; and 2-ethyl-2-butyl-1,3-propanediol; butanediols including 1,4-butanediol; 1,3-butanediol; and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-capro lactone and ethylene glycol); hydroxyalkylated bisphenols; polyether glycols, for example, poly(oxytetramethylene) glycol; trimethylol propane; pentaerythritol; di-pentaerythritol; trimethylol ethane; trimethylol butane; dimethylol cyclohexane; glycerol and the like or combinations thereof.

In certain embodiments, the first polyester material may be formed from an unsaturated polyol. Suitable examples of unsaturated polyols include, but are not limited to one or more of the following: trimethylol propane monoallyl ether; trimethylol ethane monoallyl ether; prop-1-ene-1,3-diol or combinations thereof.

The term "alk" or "alkyl", as used herein unless otherwise defined, relates to saturated hydrocarbon radicals being straight, branched, cyclic or polycyclic moieties or combinations thereof and contain 1 to 20 carbon atoms, preferably 1 to 10 carbon atoms, more preferably 1 to 8 carbon atoms, still more preferably 1 to 6 carbon atoms, yet more preferably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like. The term "alkylene", as used herein, relates to a bivalent radical alkyl group as defined above. For example, an alkyl group such as methyl which would be represented as —$CH_3$, becomes methylene, —$CH_2$—, when represented as an alkylene. Other alkylene groups should be understood accordingly. The term "alkenyl", as used herein, relates to hydrocarbon radicals having one or several, preferably up to 4, double bonds, being straight, branched, cyclic or polycyclic moieties or combinations thereof and containing from 2 to 18 carbon atoms, preferably 2 to 10 carbon atoms, more preferably from 2 to 8 carbon atoms, still more preferably 2 to 6 carbon atoms, yet more preferably 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH=$CH_2$, becomes ethenylene, —CH=CH—, when represented as an alkenylene. Other alkenylene groups should be understood accordingly.

The term "alkynyl", as used herein, relates to hydrocarbon radicals having one or several, preferably up to 4, triple bonds, being straight, branched, cyclic or polycyclic moieties or combinations thereof and having from 2 to 18 carbon atoms, preferably 2 to 10 carbon atoms, more preferably from 2 to 8 carbon atoms, still more preferably from 2 to 6 carbon atoms, yet more preferably 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$ or aryl, wherein $R^{19}$ to $R^{27}$ each independently represent hydrogen, aryl or lower alkyl, and/or be interrupted by one or more oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as —C≡CH, becomes ethynylene, —C≡C—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by one or more oxygen or sulphur atoms, or by silano or dialkylsilcon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as -Ph, becomes phenylene, -Ph-, when represented as an arylene. Other arylene groups should be understood accordingly.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

The first polyester material may be formed from any suitable molar ratio of polyacid to polyol. In certain embodiments, the molar ratio of polyacid to polyol in the first polyester material may be from about 20:1 to 1:20, suitably from about 10:1 to 1:10, such as from about 5:1 to 1:5, or even from about 2:1 to 1:2. Suitably, the molar ratio of polyacid to polyol in the first polyester material may be about 1:1.

In certain embodiments, the first polyester material of the present invention may optionally be formed from one or more additional monomers. Suitably, the first polyester material of the present invention may optionally include one or more additional monomers selected from monoacids or monohydric alcohols or combinations thereof. Suitably, the optional additional monomers may be organic.

In certain embodiments, the first polyester material may optionally be formed from an additional monoacid. "Monoacid", and like terms as used herein, refers to compounds having one carboxylic acid group and includes an ester of the monoacid (where the acid group is esterified) or an anhydride. The monoacid is suitably an organic monoacid.

The first polyester material may optionally be formed from any suitable additional monoacid. Suitable examples include, but are not limited to one or more of the following: benzoic acid; cyclohexane carboxylic acid; tricyclodecane carboxylic acid; camporic acid; benzoic acid; t-butyl benzoic acid; $C_1$-$C_{18}$ aliphatic carboxylic acids such as acetic acid; propanoic acid; butanoic acid; hexanoic acid; oleic acid; linoleic acid; undecanoic acid; lauric acid; isononanoic acid; fatty acids; hydrogenated fatty acids of naturally occurring oils; esters and/or anhydrides of any of the aforementioned acids and combinations thereof.

In certain embodiments, the first polyester material may optionally be formed from an additional monohydric alcohol. "Monohydric alcohol" and like terms as used herein, refers to compounds having one hydroxyl group. Suitably, the monohydric alcohol is an organic monohydric alcohol.

The first polyester material may optionally be formed from any suitable additional monohydric alcohol. Suitable examples include but are not limited to one or more of the following: benzyl alcohol; hydroxyethoxybenzene; methanol; ethanol; propanol; butanol; pentanol; hexanol; heptanol; dodecyl alcohol; stearyl alcohol; oleyl alcohol; undecanol; cyclohexanol; phenol; phenyl carbinol; methylphenyl carbinol; cresol; monoethers of glycols; halogen-substituted or other substituted alcohols and combinations thereof.

The first polyester material may optionally be formed from any suitable molar ratio of polyacid+polyol to one or more additional monomer. In certain embodiments, the first polyester material may comprise a molar ratio of polyacid+polyol to one or more additional monomer of from 100:1 to 1:1, suitably from 100:1 to 5:1, such as from 100:1 to 20:1, or even from 100:1 to 50:1.

In certain embodiments, the first polyester material may be formed from commercially available polyester materials. Suitable commercially available polyester materials include, but are not limited to the following: the DYNAPOL (registered trademark) line of polyester resins commercially available from Evonik Industries AG, Coatings & Additives, Rodenbacher Chaussee 4, 63457 Hanau-Wolfgang, Germany such as DYNAPOL LS615.

The first polyester material may have any suitable hydroxyl value (OHV). In certain embodiments, the first polyester material may have an OHV from about 0 to 100 KOH/g. Suitably, the first polyester material may have an OHV from about 0 to 50 KOH/g, such as from about 2.5 to 30 KOH/g or even from about 2.5 to 20 KOH/g.

The first polyester material may have any suitable acid value (AV). In certain embodiments, the first polyester material may have an AV from about 0 to 100 KOH/g. Suitably, the first polyester material may have an AV from about 0 to 50 KOH/g, such as from about 2.5 to 30 KOH/g or even from about 2.5 to 20 KOH/g.

The first polyester material may have any suitable glass transition temperature (Tg). In certain embodiments, the first polyester may have a Tg of from about 40 to 120° C., suitably from about 50 to 100° C., such as from about 60 to 80° C.

The Tg of the first polyester material may be measured by any suitable method. Methods to measure Tg will be well known to a person skilled in the art. Suitably, the Tg is measured according to ASTM D6604-00(2013) ("Standard Practice for Glass Transition Temperatures of Hydrocarbon Resins by Differential Scanning Calorimetry". Heat-flux differential scanning calorimetry (DSC), sample pans: aluminium, reference: blank, calibration: indium and mercury, sample weight: 10 mg, heating rate: 20° C./min).

The second polyester material (b) according to the present invention may comprise the reaction product of a polyacid and a polyol.

The second polyester material may be formed from any suitable polyacid. Suitable examples include, but are not limited to one or more of the following: maleic acid; fumaric acid; itaconic acid; adipic acid; azelaic acid; succinic acid; sebacic acid; glutaric acid; decanoic diacid; dodecanoic diacid; phthalic acid; isophthalic acid; 5-tert-butyl-isophthalic acid; tetrachlorophthalic acid; tetrahydrophthalic acid; trimellitic acid; naphthalene dicarboxylic acid; naphthalene tetracarboxylic acid; terephthalic acid; hexahydrophthalic acid; methylhexahydrophthalic acid; dimethyl terephthalate; cyclohexane dicarboxylic acid; chlorendic anhydride; 1,3-cyclohexane dicarboxylic acid; 1,4-cyclohexane dicarboxylic acid; tricyclodecane polycarboxylic acid; endomethylene tetrahydrophthalic acid; endoethylene hexahydrophthalic acid; cyclohexanetetra carboxylic acid; cyclobutane tetracarboxylic; acids and anhydrides of all the aforementioned acids and combinations thereof.

In certain embodiments, the second polyester material may be formed from: terephthalic acid; isophthalic acid; or a combination thereof.

In certain embodiments, the second polyester material may comprise terephthalic acid.

The second polyester material may be formed from any suitable polyol. Suitable examples include, but are not limited to one or more of the following: alkylene glycols, such as ethylene glycol; propylene glycol; diethylene glycol; dipropylene glycol; triethylene glycol; tripropylene glycol; hexylene glycol; polyethylene glycol; polypropylene glycol and neopentyl glycol; hydrogenated bisphenol A; cyclohexanediol; propanediols including 1,2-propanediol; 1,3-propanediol; butyl ethyl propanediol; 2-methyl-1,3-propanediol; and 2-ethyl-2-butyl-1,3-propanediol; butanediols including 1,4-butanediol; 1,3-butanediol; and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-capro lactone and ethylene glycol); hydroxyalkylated bisphenols; polyether glycols, for example, poly(oxytetramethylene) glycol; trimethylol propane; pentaerythritol; di-pentaerythritol; trimethylol ethane; trimethylol butane; dimethylol cyclohexane; glycerol and the like or combinations thereof.

In certain embodiments, the second polyester material may be formed from an unsaturated polyol. Suitable examples include, but are not limited to one or more of the following: trimethylol propane monoallyl ether; trimethylol ethane monoallyl ether; prop-1-ene-1,3-diol or combinations thereof.

In certain embodiments, the second polyester material may be formed from: 1,2-propanediol; 1,4-bis(hydroxymethyl)cyclohexane; 2,2-dimethyl-1,3-propanediol; ethylene glycol; or a combination thereof.

In certain embodiments, the second polyester material may comprise 1,2-propanediol.

Suitably, the second polyester material may be formed from terephthalic acid and 1,2-propanediol.

The second polyester material may be formed from any suitable molar ratio of polyacid to polyol. In certain embodiments, the molar ratio of polyacid to polyol in the high molecular weight polyester material may be from about 20:1 to 1:20, suitably from about 10:1 to 1:10, such as from about 5:1 to 1:5, or even from about 2:1 to 1:2. Suitably, the molar ratio of polyacid to polyol in the second weight polyester material may be 1:1.

In certain embodiments, the second polyester material of the present invention may optionally be formed from one or more additional monomers. Suitably, the second polyester material of the present invention may optionally be formed from one or more additional monomers selected from monoacids; monohydric alcohols; polyacids; polyhydric alcohols; or combinations thereof. Suitably, the optional additional monomers may be organic.

In certain embodiments, the second polyester material may optionally be formed from an additional monoacid. Suitably, the monoacid may be an organic monoacid.

The second polyester material may optionally be formed from any suitable additional monoacid. Suitable examples include, but are not limited to one or more of the following: benzoic acid; cyclohexane carboxylic acid; tricyclodecane carboxylic acid; camporic acid; benzoic acid; t-butyl benzoic acid; $C_1$-$C_{18}$ aliphatic carboxylic acids such as acetic acid; propanoic acid; butanoic acid; hexanoic acid; oleic acid; linoleic acid; undecanoic acid; lauric acid; isononanoic acid; fatty acids; hydrogenated fatty acids of naturally occurring oils; esters and/or anhydrides of any of the aforementioned acids and combinations thereof.

In certain embodiments, the second polyester material may optionally be formed from an additional monohydric alcohol. Suitably, the monohydric alcohol may be an organic monohydric alcohol.

The second polyester material may optionally be formed from any suitable additional monohydric alcohol. Suitable examples include but are not limited to one or more of the following: benzyl alcohol; hydroxyethoxybenzene; methanol; ethanol; propanol; butanol; pentanol; hexanol; heptanol; dodecyl alcohol; stearyl alcohol; oleyl alcohol; undecanol; cyclohexanol; phenol; phenyl carbinol; methylphenyl carbinol; cresol; monoethers of glycols; halogen-substituted or other substituted alcohols and combinations thereof.

The second polyester material may optionally be formed from any suitable molar ratio of polyacid+polyol to one or more additional monomer. In certain embodiments, the second polyester material may comprise a molar ratio of polyacid+polyol to one or more additional monomer of from about 100:1 to about 1:1, suitably from about 100:1 to about 5:1, such as from about 100:1 to 20:1, or even from about 100:1 to 50:1.

In certain embodiments, the second polyester material may be formed from commercially available polyester materials. Suitable commercially available polyester materials include, but are not limited to the following: the SKYBON (registered trademark) line of polyester resins commercially available from SK Chemicals, 310, Pangyo-rog, Bundang-gu, Seongnam-si, Gyeonggi-do 463-400 Korea such as ES-660.

The second polyester material may have any suitable gross hydroxyl value (OHV). In certain embodiments, the second polyester material may have a gross OHV from about 0 to 100 KOH/g. Suitably, the first polyester material may have a gross OHV from about 0 to 50 KOH/g, such as from about 0 to 30 KOH/g or even from about 0 to 20 KOH/g. In certain embodiments, the second polyester material may have a gross OHV from about 0 to 20 mg KOH/g, such as from about 5 to 10 mg KOH/g, suitably from about 2 to 5 mg KOH/g.

Suitably, the gross OHV is expressed on solids.

The second polyester material may have any suitable acid value (AV). In certain embodiments, the second polyester material may have an AV from about 0 to 100 KOH/g. Suitably, the first polyester material may have an AV from about 0 to 50 KOH/g, such as from about 0 to 30 KOH/g or even from about 0 to 20 KOH/g. In certain embodiments, the second polyester material may have an AV from about 0 to 20 mg KOH/g, such as from about 5 to 10 mg KOH/g, suitably from about 2 to 5 mg KOH/g.

Suitably, the AV is expressed on solids.

The second polyester material may have any suitable glass transition temperature (Tg). In certain embodiments, the second polyester may have a Tg of from about 40 to 150° C., suitably from about 50 to 150° C., such as from about 60 to 120° C. In certain embodiments, the second polyester material may have a Tg of at least about 80° C. In certain embodiments, the second polyester material may have a Tg of up to 100° C., suitably up to about 120° C., or even up to about 150° C. Suitably, the second polyester material may have a Tg from about 80° C. to 150° C., more suitably from about 80° C. to 120° C.

The Tg of the second polyester material may be measured by any suitable method. Methods to measure Tg will be well known to a person skilled in the art. Suitably, the Tg is measured according to ASTM D6604-00(2013) ("Standard Practice for Glass Transition Temperatures of Hydrocarbon Resins by Differential Scanning Calorimetry". Heat-flux differential scanning calorimetry (DSC), sample pans: aluminium, reference: blank, calibration: indium and mercury, sample weight: 10 mg, heating rate: 20° C./min).

The reaction to form the first polyester material and/or the second polyester material may be performed in the presence of an esterification catalyst. Suitable examples of esterification catalysts include, but are not limited to one or more of the following: tin, titanium and zinc catalysts such as dibutyl tin oxide (DBTO); stannous chloride; stannous oxalate; stannous octoate; butyl stannoic acid; tetra-n-butyl titanate; tetra isopropyl titanate; zinc acetate; zinc stearate and combinations thereof.

In certain embodiments, the second polyester material may comprise the reaction product of;
  (i) 1,2-propanediol,
  (ii) terephthalic acid, and
  (iii) a molecular weight increasing agent,
wherein the second polyester material has a number-average molecular weight (Mn) of at least about 6,100 Da and a glass transition temperature (Tg) of at least about 80° C.

Therefore, according to a second aspect of the present invention there is provided a coating composition comprising;
  (a) a first polyester material having a number-average molecular weight (Mn) of 500 to 5,500 Daltons, and
  (b) a second polyester material,
wherein the second polyester material (b) comprises the reaction product of;

(i) 1,2-propanediol,
(ii) terephthalic acid, and
(iii) a molecular weight increasing agent,
characterised in that the high molecular weight polyester material has a number-average molecular weight (Mn) of at least 6,100 Da and a glass transition temperature (Tg) of at least about 80° C.

By "molecular weight increasing agent" we mean a substance that increases the number-average molecular weight (Mn) of the high molecular weight polyester material.

The molecular weight increasing agent may be any suitable compound capable of increasing the Mn of the high molecular weight polyester material. Suitably, the molecular weight increasing agent may comprise a polyacid, a polyol or a combination thereof.

In certain embodiments, the molecular weight increasing agent may comprise a polyacid. Suitably, the molecular weight increasing agent may comprise a diacid.

In certain suitable embodiments, the molecular weight increasing agent comprises a diacid of general formula (I)

ROOC—$X_n$—COOR      formula (I)

wherein each R independently represents hydrogen or an alkyl, alkenyl, alkynyl, or aryl group;
n=0 or 1; and wherein X represents a bridging group selected from: an alkylene group; an alkenylene group; an alkynylene group; an arylene group; wherein the bridge between the —COOR groups is $C_1$ or $C_2$.

Suitable examples of polyacid molecular weight increasing agents include, but are not limited to one or more of the following: oxalic acid; malonic acid; succinic acid; orthophthalic acid; maleic acid; fumaric acid; itaconic acid; methylmalonic acid; ethylmalonic acid; propylmalonic acid; 2-methylsuccinic acid; 2-ethylsuccinic acid; 2-propylsuccinic acid; trans-cyclopentane-1,2-dicarboxylic acid; cis-cyclopentane-1,2-dicaboxylic acid; trans-cyclohexane-1,2-dicaboxylic acid; cis-cyclohexane-1,2-dicaboxylic acid; acids and anhydrides of all the aforementioned acids and combinations thereof. In certain embodiments, the polyacid comprises maleic anhydride or itaconic acid or a combination thereof.

Suitably, the polyacid molecular weight increasing agent comprises maleic anhydride.

In certain embodiments, the molecular weight increasing agent may comprise a polyol. Suitably, the molecular weight increasing agent may comprise a triol.

In certain embodiments, the hydroxyl groups of the polyol molecular weight increasing agents may be connected by a $C_1$ to $C_3$ alkylene group. The $C_1$ to $C_3$ alkylene group may be substituted or unsubstituted. The $C_1$ to $C_3$ alkylene group may be optionally substituted with one or more of the following: halo; hydroxyl; nitro; mercapto; amino; alkyl; alkoxy; aryl; sulfo and sulfoxy groups. The $C_1$ to $C_3$ alkylene group may be linear or branched. The $C_1$ to $C_3$ alkylene group may be saturated or unsaturated.

In certain embodiments, there may be no more than 3 carbon atoms connecting between the hydroxyl groups.

Suitable examples of polyol molecular weight increasing agents include, but are not limited to one or more of the following: methylene glycol; ethylene glycol; propylene glycol; neopentyl glycol; 1,2-propanediol; butyl ethyl propanediol; 2-methyl-1,3-propanediol; 2-ethyl-2-butyl-1,3-propanediol; trimethylolmethane; trimethylolethane; trimethylolpropane; glycerol; pentaerythritol; and combinations thereof. Suitably, the polyol molecular weight increasing agent comprises trimethylolpropane.

The terephthalic acid (ii) may be in any suitable form. It will be well known to a person skilled in the art that terephthalic acid is often provided in a form which also contains isophthalic acid as a contaminant. However, in one embodiment, the terephthalic acid may be provided in a form which is substantially free of isophthalic acid. By "substantially free" we mean to refer to terephthalic acid which contains less than about 5 wt % isophthalic acid, preferably less than about 2 wt % isophthalic acid, more preferably less than about 0.05 wt % isophthalic acid. In certain embodiments the terephthalic acid may contain about 0 wt % isophthalic acid.

In certain embodiments, the second polyester material according to the second aspect of the present invention may comprise any suitable molar ratio of (i)+(ii):(iii). In certain embodiments the (i)+(ii):(iii) may range from about 100:1 to 1:1, such as from about 80:1 to 5:1. As a non-limiting example, when the molecular weight increasing agent is a polyacid the molar ratio of (i)+(ii):(iii) may be about 25:1. As a further non-limiting example, when the molecular weight increasing agent is a polyol the molar ratio of (i)+(ii):(iii) may be about 80:1.

In certain embodiments, the second polyester material may have a low degree of branching. The second polyester material according to the second aspect of the present invention may be substantially linear or be slightly branched. For example, the degree of branching of the second polyester material may be measured by the polydispersity index of the said high molecular weight polyester material. The polydispersity index of a polymer is given by the ratio of Mw to Mn (Mw/Mn), wherein Mw is the weight-average molecular weight and Mn is the number average molecular weight. Suitably, the polydispersity index of the second polyester material is from about 1 to 20, suitably from about 2 to 10.

In certain embodiments, the second polyester material may have a molecular weight above the entanglement molecular weight of said high molecular weight polyester material.

"Entanglement molecular weight" and like terms, as used herein, refers to the molecular weight at which the high molecular weight polyester material becomes large enough to entangle. For the avoidance of doubt the molecular weight may be the number-average molecular weight or the weight-average molecular weight. Entanglement molecular weight is typically defined as the molecular weight at which the physical properties, especially the viscosity of the polyester material change.

Typically, the entanglement molecular weight is determined by plotting the log of the melt viscosity against the log of the molecular weight of a polymer. Typically, as the molecular weight increases, the plot follows a gently upward sloping linear path. However, once the entanglement molecular weight is reached, the gently sloping linear path increases to a rapidly sloping linear path. Hence the entanglement molecular weight may be determined as the point on the plot where the slope changes from gently sloping to rapidly sloping.

Techniques to measure the melt viscosity will be well known to a person skilled in the art. Suitably, the melt viscosity may be measured at a high shear rate such as that applied by a cone and plate rheometer, typical methods are as described in standard methods such as ASTM D4287. Films formed from the polyester material according to the present invention having a molecular weight above the critical entanglement molecular weight of the said polyester material, were found to have superior film forming properties.

The components (i), (ii) and (iii) of the second polyester material according to the second aspect of the present invention may be contacted in any order.

In certain embodiments, the second polyester material according to the second aspect of the present invention may be prepared in a one step process. Suitably, in a one step process, the components (i), (ii) and (iii) are all reacted together at the same time. Suitably, the second polyester material according to the second aspect of the present invention may be prepared in a one step process where the molecular weight increasing agent comprises a polyol.

Suitably, in a one step process, components (i), (ii) and (iii) may be contacted together at a first reaction temperature, T1, wherein T1 may be a temperature of between about 90° C. and 260° C., suitably from about 200° C. to 250° C., such as from about 200° C. to 230° C.

Typically, in a one step process, the reaction is allowed to proceed for a total period of about 1 minute to 100 hours, such as from about 2 hours to 80 hours. It will be appreciated by a person skilled in the art that the reaction conditions may be varied depending on the reactants used.

The first polyester material may be present in the coating composition in any suitable amount. In certain embodiments, the first polyester material may be present in the coating compositions in amounts from about 1 wt % to 50 wt % based on the total solid weight of the coating composition. Suitably, the first polyester material may be present in the coating compositions in amounts from about 1 wt % to 20 wt %, such as from about 1 wt % to 10 wt %, or even from about 5 wt % to 10 wt % based on the total solid weight of the coating composition.

The second polyester material may be present in the coating composition in any suitable amount. In certain embodiments, the second polyester material may be present in the coating compositions in amounts from about 10 wt % to 50 wt % based on the total solid weight of the coating composition. Suitably, the second polyester material may be present in the coating compositions in amounts from about 15 wt % to 50 wt %, such as from about 20 wt % to 40 wt %, or even from about 20 wt % to 30 wt % based on the total solid weight of the coating composition.

Suitably, the total amount of polyester material in the coating composition may be from about 11 wt % to 100 wt %, or even from about 25 wt % to 40 wt % based on the total solid weight of the coating composition.

In certain embodiments, the coating composition may comprise a further binder. Suitable further binders will be well known to a person skilled in the art. Suitable examples of further binders include, but are not limited to the following: polyester resins; acrylic resins; alkyd resins; polyurethane resins; polysiloxane resins; epoxy resins or combinations thereof. In certain embodiments, the further binder may comprise an epoxy functional binder, such as bisphenol A diglycidyl ether or bisphenol F diglycidyl ether. The further binder, when present, may suitably be used in the overcoatable primer coating composition in amounts from about 1 to 50 wt %, suitably from about 5 to 30 wt %, such as from about 10 to 20 wt % based on the total solid weight of the coating composition.

In certain embodiments, polyester materials (a) and (b) may form from about 50 to 100% of the total amount of polyester material present in the coating composition, suitably from about 75 to 100% of the total amount of polyester material present in the coating composition, such as from about 85 to 100% of the total amount of polyester material present in the coating composition, or even from about 95 to 100% of the total amount of polyester material present in the coating composition.

In certain embodiments, the polyester materials (a) and (b) may form about 100% of the total amount of polyester material present in the coating composition.

In certain embodiments, polyester materials (a) and (b) may form from about 50 to 100% of the total amount of binder material present in the coating composition, suitably from about 75 to 100% of the total amount of binder material present in the coating composition, such as from about 85 to 100% of the total amount of binder material present in the coating composition, or even from about 95 to 100% of the total amount of binder material present in the coating composition.

In certain embodiments, the polyester materials (a) and (b) may form about 100% of the total amount of binder material present in the coating composition.

The coating composition may optionally comprise one or more solvent. The coating composition may comprise a single solvent or a mixture of solvents. The solvent may comprise water, an organic solvent, a mixture of water and an organic solvent or a mixture of organic solvents.

The organic solvent preferably has sufficient volatility to essentially entirely evaporate from the coating composition during the curing process. As a non-limiting example, the curing process may be by heating at 130-230° C. for 1-15 minutes.

Suitable organic solvents include, but are not limited to one or more of the following: aliphatic hydrocarbons such as mineral spirits and high flash point naptha; aromatic hydrocarbons such as benzene; toluene; xylene; solvent naptha 100, 150, 200; those available from Exxon-Mobil Chemical Company under the SOLVESSO trade name; alcohols such as ethanol; n-propanol; isopropanol; and n-butanol; ketones such as acetone; cyclohexanone; methylisobutyl ketone; methyl ethyl ketone; esters such as ethyl acetate; butyl acetate; n-hexyl acetate; glycols such as butyl glycol; glycol ethers such as methoxypropanol; ethylene glycol monomethyl ether; ethylene glycol monobutyl ether and combinations thereof. The solvent, when present, may suitably be used in the coating composition in amounts of about 10 to 90 wt %, such as about 20 to 80 wt %, or even about 30 to 70 wt % based on the total solid weight of the coating composition.

In certain embodiments the coating composition may further comprise a catalyst. Any catalyst typically used to catalyse crosslinking reactions between polyester materials and crosslinking agents, such as for example phenolic resins, may be used. Suitable catalysts will be well known to the person skilled in the art. Suitable catalysts include, but are not limited to one or more of the following: phosphoric acid; alkyl aryl sulphonic acids such as dodecyl benzene sulphonic acid; methane sulphonic acid; paratoluene sulphonic acid; dinonyl naphthalene disulphonic acid; phenyl phosphinic acid and combinations thereof. In certain embodiments the catalyst may comprise an acid catalyst. Suitably, the catalyst may comprise phosphoric acid. In certain embodiments, the catalyst, when present, may be used in amounts of about 0.05 to 10 wt %, preferably about 0.05 to 5 wt %, more preferably about 0.05 to 2.5 wt % based on the total solid weight of the coating composition.

In certain embodiments, the coating composition may further comprise a crosslinking agent. The crosslinking agent may be any suitable crosslinking agent. Suitable crosslinking agents will be well known to the person skilled in the art. Suitable crosslinking agents include, but are not limited to one or more of the following: phenolic resins (or phenol-formaldehyde resins); aminoplast resins (or triazine-formaldehyde resins); amino resins; epoxy resins; isocyanate resins; beta-hydroxy (alkyl) amide resins; alkylated carbamate resins; polyacids; anhydrides; organometallic acid-functional materials; polyamines; polyamides and combinations thereof. In certain embodiments, the crosslinking agent comprises a phenolic resin, an aminoplast resin, an isocyanate resin or a combination thereof. In certain embodiments, the crosslinking agent comprises a phenolic resin or an aminoplast resin or a combination thereof. In certain embodiments, the crosslinking agent comprises a phenolic resin or an isocyanate resin or a combination thereof.

Non-limiting examples of phenolic resins are those formed from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. Suitably, the phenolic resins are of the resol type. By "resol type" we mean resins formed in the presence of a basic (alkaline) catalyst and optionally an excess of formaldehyde. Suitable examples of commercially available phenolic resins are, but are not limited to PHENODUR® PR285 and BR612 and resins sold under the trademark BAKELITE® such as BAKELITE 6582 LB.

Non-limiting examples of aminoplast resins are those which are formed from the reaction of a triazine such as melamine or benzoguanamine with formaldehyde. Suitably, the resultant compounds may be etherified with an alcohol such as methanol, ethanol, butanol or combinations thereof. General preparation and use of aminoplast resins is described in "The Chemistry and Applications of Amino Crosslinking Agents or Aminoplast", Vol V, Part II, page 21 ff., edited by Dr Oldring; John Wiley and Sons/Cita Technology Limited, London, 1998. Suitable examples of commercially available aminoplast resins include but are not restricted to those sold under the trademark MAPRENAL® such as MAPRENAL® MF980 and those sold under the trademark CYMEL® such as CYMEL 303 and CYMEL 1128, available from Cytec Industries. Suitably, the crosslinking agent comprises a phenolic resin.

Suitable isocyanates include but are not restricted to multifunctional isocyanates. Suitable examples of multifunctional polyisocyanates include, but are not limited to one or more of the following: aliphatic diisocyanates like hexamethylene diisocyanate and isophorone diisocyanate; and aromatic diisocyanates like toluene diisocyanate and 4,4'-diphenylmethane diisocyanate. The polyisocyanates may be blocked or unblocked. Examples of other suitable polyisocyanates include, but are non limited to one or more of the following: isocyanurate trimmers; allophanates; uretdiones of diisocyanates; polycarbodiimides and combinations thereof. Suitable examples of commercially available polyisocyanates include but are not restricted to DESMODUR VP2078 and DESMODUR N3390, which are sold by Bayer Corporation, and TOLONATE HDT90, which is sold by Rhodia Inc.

In certain embodiments, the coating composition may optionally contain an additive or combination of additives. The coating composition may optionally contain any suitable additive or combination of additives. Suitable additives will be well known to the person skilled in the art. Examples of suitable additives include, but are not limited to one or more of the following: lubricants; pigments; plasticisers; surfactants; flow control agents; thixotropic agents; fillers; diluents; organic solvents and combinations thereof.

Suitable lubricants will be well known to the person skilled in the art. Suitable examples of lubricants include, but are not limited to one or more of the following, carnauba wax and polyethylene type lubricants. In certain embodiments, the lubricant, when present, may be used in the coating composition in amounts of at least 0.1 wt % based on the total solid weight of the coating composition.

Suitable pigments will be well known to the person skilled in the art. A suitable pigment may be, for example, titanium dioxide. The pigment, when present, may be used in the coating composition in any suitable amount. In certain embodiments, the pigment, when present, may be used in the coating composition in amounts up to about 70 wt %, such as up to about 50 wt %, or even up to about 30 wt % based on the total solid weight of the coating composition.

Surfactants may optionally be added to the coating composition in order to aid in flow and wetting of the substrate. Suitable surfactants will be well known to the person skilled in the art. Suitably the surfactant, when present, is chosen to be compatible with food and/or beverage container applications. Suitable surfactants include, but are not limited to one or more of the following: alkyl sulfates (e.g., sodium lauryl sulfate); ether sulfates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The surfactants, when present, may be present in amounts between about 0.01 and 10 wt % based on the total solid weight of the coating composition.

In certain embodiments, the coating compositions according to the present invention may be substantially free, may be essentially free or may be completely free of bisphenol A (BPA) and derivatives thereof. Derivatives of bisphenol A include, for example, bisphenol A diglycidyl ether (BADGE). In certain embodiments, the coating compositions according to the present invention may also be substantially free, essentially free or completely free of bisphenol F (BPF) and derivatives thereof. Derivatives of bisphenol F include, for example, bisphenol F diglycidyl ether (BPFG). The compounds or derivatives thereof mentioned above may not be added to the composition intentionally but may be present in trace amounts because of unavoidable contamination from the environment. By "substantially free" we mean to refer to coating compositions containing less than about 1000 parts per million (ppm) of any of the compounds or derivatives thereof mentioned above. By "essentially free" we mean to refer to coating compositions containing less than about 100 ppm of any of the compounds or derivatives thereof mentioned above. By "completely free" we mean to refer to coating compositions containing less than about 20 parts per billion (ppb) of any of the compounds or derivatives thereof.

In certain embodiments, the coating compositions may be substantially free, essentially free or may be completely free of trialkyltin oxides or derivatives thereof. Examples of trialkyltin oxides include, but are not limited to one or more of the following: trimethyltin oxide; triethyltin oxide; tripropyltin oxide; tributyltin oxide or combinations thereof. By "substantially free" we mean to refer to coating compositions containing less than about 1000 parts per million (ppm) of any of the compounds or derivatives thereof mentioned above. By "essentially free" we mean to refer to coating compositions containing less than about 100 ppm of any of the compounds or derivatives thereof mentioned above. By "completely free" we mean to refer to coating compositions containing less than about 20 parts per billion (ppb) of any of the compounds or derivatives thereof.

The coating composition may be applied to any suitable container. In certain embodiments, the coating compositions may be applied to food and/or beverage containers. Suitably, the coating compositions may be applied to food and/or beverage cans. Examples of cans include, but are not limited to one or more of the following, two-piece cans, three-piece cans and the like. The coating compositions may also be applied to containers for aerosol applications such as, but not limited to, deodorant and hair spray containers.

The coating composition may be applied to the food and/or beverage container by any suitable method. Methods of applying said coating compositions will be well known to a person skilled in the art. Suitable application methods include, but are not limited to one or more of the following: spray coating; roll coating; dipping; and/or electrocoating. It will be appreciated by the person skilled in the art that for two-piece cans, one or more of the coating compositions may typically be applied by spray coating after the can is made. It will also be appreciated by the person skilled in the art that for three-piece cans, a flat sheet may typically be roll coated with one or more of the present coating compositions first and then the can may be formed. However, the application of the coating compositions is not limited to these methods. The coating compositions according to the present information may be applied to the interior and/or exterior surface or surfaces of the container. Suitably, all or part of the surface may be covered.

The coating composition may be applied to any suitable dry film thickness. In certain embodiments, the coating compositions may be applied to a dry film thickness of about 0.1 mm to 1 mm, preferably about 0.1 mm to 0.5 mm, more preferably about 0.15 mm to 0.3 mm.

The coating composition according to the present invention may be applied to a substrate as a single layer or as part of a multi layer system. In certain embodiments, the coating composition may be applied as a single layer. In certain embodiments, the coating composition may be applied as the first coat of a multi coat system. Suitably, the coating composition may be applied as an undercoat or a primer. The second, third, fourth etc. coats may comprise any suitable paint such as those containing, for example, epoxy resins; polyester resins; polyurethane resins; polysiloxane resins; hydrocarbon resins or combinations thereof. In certain embodiments, the coating compositions may be applied on top of another paint layer as part of a multi layer system. For example, the coating composition may be applied on top of a primer. The coating compositions may form an intermediate layer or a top coat layer. The coating composition may be applied to a substrate once or multiple times.

According to a third aspect of the present invention there is provided an article coated on at least a portion thereof with a coating composition according to any of the above aspects.

Suitably, the article comprises a food and/or beverage container.

According to a fourth aspect of the present invention there is provided a two layer coating system for a food and/or beverage container comprising an undercoat layer and an overcoat layer, wherein the undercoat layer comprises;
(a) a first polyester material having a number-average molecular weight (Mn) of 500 to 5,500 Daltons, and
(b) a second polyester material having a number-average molecular weight (Mn) of 6,000 to 100,000 Daltons.

The overcoat layer according to the third aspect of the present invention may comprise any suitable composition.

In certain embodiments, the overcoat layer may comprise one or more of the following: acrylic resins; epoxy resins; polyester resins; alkyd resins; polyurethane resins; polysiloxane resins; polyvinyl chloride resins; phenolic resins; urethane resins; polyamide resins; polyolefin resins and combinations thereof.

In certain embodiments, the overcoat layer may comprise a polyvinyl chloride (PVC) resin.

The overcoat layer may comprise any suitable polyvinyl chloride (PVC) resin. In certain embodiments, polyvinyl chloride (PVC) resin may be a polyvinyl chloride (PVC) homopolymer, a polyvinyl chloride (PVC) copolymer or a combination thereof.

In certain embodiments, the polyvinyl chloride (PVC) resin may be a copolymer comprising comonomers selected from one or more of, but not limited to, vinyl chloride, vinyl acetate, dicarboxylic acids, hydroxy acrylate, dicarboxylic acid ester, maleic copolymer.

The polyvinyl chloride (PVC) resin may have any suitable weight-average molecular weight (Mw). Typically, the polyvinyl chloride (PVC) resin may have a Mw of between 60,000 and 200,000 Da, such as between 70,000 and 150,000 Da, or between 75,000 and 140,000 Da.

The polyvinyl chloride (PVC) resin may have a number-average molecular weight (Mn) of between 40,000 and 80,000 Da, such as between 42,500 and 75,000 Da, suitably between 45,000 and 72,500 Da.

The polyvinyl chloride (PVC) resin may be present in the overcoat layer in any suitable amount. Typically, the polyvinyl chloride (PVC) resin may be present in the overcoat layer in an amount of at least 5 wt %, more typically at least 10 wt %, most typically at least 20 wt %, based on the total solid weight of the overcoat layer.

The polyvinyl chloride (PVC) resin may be present in the overcoat layer in an amount of between 10 wt % to 85 wt %, such as 15 wt % to 65 wt %, suitably 30 wt % to 60 wt %, based on the total solid weight of the overcoat layer.

In certain embodiments, the overcoat layer may comprise a functionalised polyvinyl chloride (PVC) resin. In a particularly suitable embodiment, the functionalised polyvinyl chloride (PVC) resin is functionalised with hydroxyl groups.

In certain embodiments, the overcoat layer may comprise an organosol usually comprising two phases in a liquid carrier. For example, the two phases may comprise a dispersed phase and an at least partially dissolved phase. The dispersed phase may comprise a polyvinyl chloride (PVC) resin. The at least partially dissolved phase may comprise a polyester resin. Suitably, the polyester resin is substantially dissolved in the liquid carrier.

The overcoat layer may contain at least 7 wt %, such as at least 9 wt % of polyester (co)polymer, based on the total solid weight of the overcoat layer. The overcoat layer may contain up to 70 wt %, such as up to 60 wt % or 50 wt % of polyester (co)polymer, for example up to 50 wt % or 40 wt % or 30 wt %, based on the total solid weight of the overcoat layer. Typically, the overcoat layer may contain between 7 wt % to 70 wt % of polyester (co)polymer, more typically between 7 wt % to 60 wt % or 7 wt % to 50 wt %, such as 9 wt % to 40 wt %, or 9 wt % to 35 wt % or 9 wt % to 30 wt % of polyester (co)polymer based on the total solid weight of the overcoat layer.

The overcoat layer may optionally comprise one or more solvent. The overcoat layer may comprise a single solvent or a mixture of solvents. The solvent may comprise water, an organic solvent, a mixture of water and an organic solvent or a mixture of organic solvents.

The overcoat layer according to the present invention may optionally contain an additive or combination of additives. The undercoat layer may optionally contain any suitable additive. Suitable additives will be well known to the person skilled in the art. Examples of suitable additives include, but are not limited to one or more of the following: lubricants; pigments; plasticisers; surfactants; flow control agents; thixotropic agents; fillers; diluents; organic solvents, rust inhibitors and combinations thereof.

Any or all of the layers used in the multilayer embodiment of the present invention can be substantially free, essentially free or completely free of BPA, BPF and derivatives thereof.

According to a further aspect of the present invention there is provided an article coated on at least a portion thereof with a two-layer coating system according to the fourth aspect of the present invention.

Suitably, the article is a food and/or beverage container.

As used herein, the singular includes the plural and plural encompasses singular, unless specifically stated otherwise. For example, the use of the singular, i.e. "a" or "an", includes "one or more". In addition, as used herein, the use of "or" means "and/or" unless specifically stated otherwise, even though "and/or" may be explicitly used in certain instances.

All of the features contained herein may be combined with any of the above aspects and in any combination.

For a better understanding of the invention, and to show how embodiments of the same may be carried into effect, reference will now be made, by way of example, to the following experimental data.

EXAMPLES

Examples 1 and 2

Coating compositions according to the present invention were prepared according to the formulations in Table 1. All amounts are given in parts by weight (pbw).

TABLE 1

Formulation of Examples 1 and 2

|  | Example 1 | Example 2 |
| --- | --- | --- |
| Polyester ES410[1] | 27 | 34 |
| Polyadipate[2] | 7 | 5 |
| Crosslinker* | 17.3 | 8.3 |
| Defoamer** | 0.05 | 0.05 |
| Levelling Agent[‡] | 0.01 | 0.01 |
| Lubricant[‡‡] | 0.5 | 0.5 |
| SOLVESSO 100 | 20 | 20 |
| Dibasic ester | 8.14 | 10.14 |
| SOLVESSO 150 ND | 20 | 20 |
| Total | 100 | 98 |

[1]Available from SK Chemicals. Number-average molecular weight (Mn) = 18,000 Da.
[2]Available from Evonik Industries. Number-average molecular weight (Mn) = 4,000 Da.
*Phenolic resin 284 available from Shanghai Xin Hua
**BYK 088 available from BYK-Chemie
[‡]PERENOL ® F-3 available from DYNO
[‡‡]Lanolin Test Methods
Viscosity:
The viscosity of the coating compositions was measured in accordance with ASTM D1200-10.
Test Panel Preparation:
The coating samples were applied onto 0.22 mm tinplate using a wire wound bar coater to give a 7.0 g/square meter dried coating weight. The coated panels were transferred to a laboratory box oven for 10 minutes at 200° C.
Flexibility:
The flexibility of the coatings was tested using the box test as follows. A box, having rounded corners, was stamped from the coated panels using a press such that the coating was on the exterior of the box. Each corner of the stamped box had a different corner diameter (i.e. each corner had a different height to corner diameter ratio). The flexibility of the coatings at each corner were inspected visually.
Acid Resistance:
The coated panels were immersed in a deionised water solution comprising 3% acetic acid inside a Kilner jar and sterilised for 30 minutes at 121° C. in an autoclave. After this time, the coated panels were inspected visually for adhesion and rust.
Wedge Bend Test:
A 10 cm×4 cm coated panel was bent on a 6 mm steel rod to form a U-shaped strip 10 cm long and 2 cm wide. The U-shaped strip was then placed onto a metal block with a built in tapered recess. A 2 kg weight was dropped onto the recessed block containing the U-shaped strip from a height of 60 cm in order to from a wedge. The test piece was then immersed in a copper sulphate ($CuSO_4$) solution acidified with hydrochloric acid (HCl) for 2 minutes, followed by rinsing with tap water. The sample was then carefully dried by blotting any residual water with tissue paper. The length of coating without any fracture was measured. The result was quoted in mm passed. The wedge bends were tested in triplicate and the average value was quoted.
Lactic Acid Sterilisation:
This test is used to determine if the coatings are compatible for use in food and/or beverage containers. The coated panels were half immersed in a deionised water solution comprising 1% lactic acid inside a Kilner jar and sterilised for 1 hour at 130° C. in an autoclave. After this time, the coated panels were quickly removed whilst still hot and rinsed whilst under cold water. The portion of the coated panel immersed in lactic acid and the portion exposed to the vapour, which was produced during the sterilisation process, were assessed separately for extent of damage. The results were inspected visually.
$Na_2S$ Solution Sterilisation:
The coated panels were immersed in a deionised water solution comprising 0.05% $Na_2S$, which was adjusted to pH 9 with lactic acid, inside a pressurisable metal container and sterilised at 121° C. for 30 minutes in an autoclave. After this time, the coated panels were inspected visually for sulphur spots.

TABLE 2

Test Results for Examples 1 and 2

|  | Example 1 | Example 2 |
| --- | --- | --- |
| Viscosity (Ford 4#, 25° C.) | 100 sec | 100 sec |
| Flexibility | Good | Good |
| Acid Resistance (121° C., 30 min) | No blush | No blush |
| Wedge Bend | 120 mm | 110 mm |
| Lactic Acid Sterilisation (121° C., 30 min) | No blush | No blush |

Examples 3-5

Top coat compositions containing a PVC resin were prepared according to the formulations in Table 3. All amounts are given in parts by weight (pbw).

TABLE 3

Formulation of Examples 3-5

|  | Example 3 | Example 4 | Example 5 |
| --- | --- | --- | --- |
| PVC Resin‡ | 19.00 | 15.00 | 15.00 |
| Crosslinker‡‡ | 1.64 | 1.64 | 2.64 |
| Plasticiser* | 5.47 | — | 5.47 |
| Surfactant** | 0.123 | 0.123 | 0.123 |
| Defoamer*** | 0.05 | 0.05 | 0.05 |
| n-butanol | 15.917 | 21.917 | 20.917 |
| Toluene | 30 | 35.47 | 30 |
| Methyl ethyl ketone | 22.25 | 20.25 | 20.25 |
| Methyl isobutyl ketone | 5.55 | 5.55 | 5.55 |
| Total | 100 | 100 | 100 |

‡UMOH available from Xinyi Jai Tai Chemical Co. LTD
‡‡Cymel ™ 1123 available from Cytec Industries Inc.
*Epoxidised soybean oil
**Sodium dodecylbenzenesulfonate
***BYK 088 from BYK-Chemie

TABLE 4

Test Result for Multilayer Coating Systems

|  | Coating System 1 | Coating System 2 | Coating System 3 |
| --- | --- | --- | --- |
| Base Coat | Example 1 | Example 1 | Example 1 |
| Top Coat | Example 3 | Example 4 | Example 5 |
| Flow on base coating | Good | Good | Good |
| Adhesion before sterilisation | 100% | 100% | 100% |
| Adhesion after sterilisation | 100% | 100% | 100% |
| Solution sterilisation 1* | No black spot | No black spot | No black spot |
| Solution sterilisation 2** | No blush | No blush | No blush |

*0.05M Na$_2$S solution sterilisation at 121° C. for 30 minutes
**2% lactic acid sterilisation at 121° C. for 30 minutes

What is claimed is:

1. A coating composition comprising;
    (a) a first polyester material having a number-average molecular weight (Mn) of 500 to 5,500 Daltons, and a glass transition temperature (Tg) of from 40° C. to 120° C.; and
    (b) a second polyester material having a number-average molecular weight (Mn) of 6,000 to 100,000 Daltons.

2. The coating composition according to claim 1, wherein the second polyester material comprises terephthalic acid and 1,2-propanediol.

3. The coating composition according to claim 1, wherein the second polyester material has a glass transition temperature (Tg) of at least 80° C.

4. The coating composition according to claim 1, wherein the coating composition comprises the first polyester material in amounts from 1 wt % to 50 wt % based on the total solid weight of the coating composition.

5. The coating composition according to claim 1, wherein the coating composition comprises the second polyester material in amounts from 10 wt % to 50 wt % based on the total solid weight of the coating composition.

6. The coating composition according to claim 1, wherein the coating composition further comprises a crosslinking agent.

7. A coating composition comprising;
    (a) a first polyester material having a number-average molecular weight (Mn) of 500 to 5,500 Daltons; and
    (b) a second polyester material having a number-average molecular weight (Mn) of at least 6,100 Daltons and a glass transition temperature (Tg) of at least about 80° C.,
    wherein the second polyester material (b) comprises the reaction product of
        (i) 1,2-propanediol,
        (ii) terephthalic acid, and
        (iii) a molecular weight increasing agent.

8. The coating composition according to claim 7, wherein the molecular weight increasing agent comprises a polyacid, a polyol, or a combination thereof.

9. The coating composition according to claim 8, wherein the polyacid comprises maleic anhydride, itaconic acid, or a combination thereof.

10. The coating composition according to claim 8, wherein the polyol comprises trimethylolpropane.

11. A food and/or beverage container coated on at least a portion thereof with the coating composition according to claim 1.

12. A two layer coating system for a food and/or beverage container comprising an undercoat layer and an overcoat layer, wherein the undercoat layer comprises;
    (a) a first polyester material having a number-average molecular weight (Mn) of 500 to 5,500 Daltons, and a glass transition temperature (Tg) of from 40° C. to 120° C.; and
    (b) a second polyester material having a number-average molecular weight (Mn) of 6,000 to 100,000 Daltons.

13. The two layer coating system according to claim 12, wherein the overcoat layer comprises a polyvinyl chloride (PVC) resin.

14. The two layer coating system according to claim 12, wherein the overcoat layer comprises a functionalised polyvinyl chloride resin.

15. A food and/or beverage container coated on at least a portion thereof with the two-layer coating system according to claim 12.

16. The coating composition of claim 7, wherein the glass transition temperature (Tg) of the second polyester material is from about 80° C. to 150° C.

* * * * *